US009264116B2

(12) United States Patent
Olesen et al.

(10) Patent No.: US 9,264,116 B2
(45) Date of Patent: *Feb. 16, 2016

(54) METHOD, APPARATUS AND SYSTEM FOR IMPLEMENTING MULTI-USER VIRTUAL MULTIPLE-INPUT MULTIPLE-OUTPUT

(71) Applicant: InterDigital Technology Corporation, Wilmington, DE (US)

(72) Inventors: Robert L Olesen, Huntington, NY (US); Donald M Grieco, Manhasset, NY (US); Kyle Jung-Lin Pan, Saint James, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/628,950

(22) Filed: Sep. 27, 2012

(65) Prior Publication Data

US 2013/0022006 A1 Jan. 24, 2013

Related U.S. Application Data

(63) Continuation of application No. 11/834,923, filed on Aug. 7, 2007, now Pat. No. 8,305,956.

(60) Provisional application No. 60/836,189, filed on Aug. 7, 2006.

(51) Int. Cl.
*H04W 4/00* (2009.01)
*H04B 7/04* (2006.01)
*H04B 7/06* (2006.01)

(52) U.S. Cl.
CPC ............ *H04B 7/0452* (2013.01); *H04B 7/0617* (2013.01); *H04B 7/0669* (2013.01); *H04B 7/0671* (2013.01)

(58) Field of Classification Search
CPC .................. H04W 72/1226; H04W 72/0406; H04B 7/0452; H04B 7/0617; H04B 7/0669; H04B 7/0671

USPC ......... 370/206, 208, 328–329, 335, 338–339, 370/342–344, 400–401; 455/101, 422.1, 455/452.1, 562.1

See application file for complete search history.

(56) References Cited

U.S. PATENT DOCUMENTS 6,968,902 B2 11/2005 Fenton et al.
7,110,463 B2 9/2006 Wallace et al.
(Continued)

FOREIGN PATENT DOCUMENTS

JP 2002-513238 A 5/2002
JP 2004-517549 A 6/2004
(Continued)

OTHER PUBLICATIONS

Boche, et al., "Analysis of Different Precoding/Decoding Strategies for Multiuser Beamforming", The 57th IEEE Semiannual Vehicular Technology Conference, VTC 2003—Spring, vol. 1, Apr. 22, 2003, 39-43.

(Continued)

*Primary Examiner* — Kevin Mew
(74) *Attorney, Agent, or Firm* — Condo Roccia Koptiw LLP

(57) ABSTRACT

A method and system for implementing multi-user virtual multiple-input multiple-output (MIMO) techniques for wireless transmit/receive units (WTRUs) having one or more antennas are disclosed. The system includes a base station and at least one WTRU having at least two antennas. The number of antennas of the base station is not less than the number of antennas of any of the WTRUs. The base station generates a channel matrix for the WTRUs and processes received signals from the WTRUs based on a measurement of the channel matrix. The WTRUs may perform transmit precoding or eigen-beamforming using the channel matrix information. The WTRUs may also perform transmit diversity.

28 Claims, 1 Drawing Sheet

(56) References Cited

U.S. PATENT DOCUMENTS

| | | | |
|---|---|---|---|
| 7,151,809 B2 | 12/2006 | Ketchum et al. | |
| 7,218,692 B2 | 5/2007 | Dabak et al. | |
| 7,272,294 B2* | 9/2007 | Zhou et al. | 385/147 |
| 7,392,460 B2 | 6/2008 | Kim et al. | |
| 7,471,963 B2 | 12/2008 | Kim et al. | |
| 7,505,527 B2 | 3/2009 | Hwang et al. | |
| 7,532,599 B2 | 5/2009 | Kim et al. | |
| 7,602,837 B2 | 10/2009 | Kotecha et al. | |
| 7,706,477 B2* | 4/2010 | Larsson | 375/340 |
| 7,860,051 B2 | 12/2010 | Kishigami et al. | |
| 7,872,963 B2 | 1/2011 | Choi et al. | |
| 7,881,673 B2 | 2/2011 | Kent et al. | |
| 8,014,455 B2* | 9/2011 | Kim et al. | 375/260 |
| 8,228,878 B2* | 7/2012 | Larsson et al. | 370/335 |
| 8,305,956 B2 | 11/2012 | Olesen et al. | |
| 8,331,342 B2* | 12/2012 | Khan et al. | 370/344 |
| 8,494,099 B2* | 7/2013 | Arviv et al. | 375/346 |
| 2003/0072285 A1* | 4/2003 | Onggosanusi et al. | 370/335 |
| 2004/0081073 A1* | 4/2004 | Walton et al. | 370/204 |
| 2004/0171385 A1 | 9/2004 | Haustein et al. | |
| 2004/0252632 A1 | 12/2004 | Bourdoux et al. | |
| 2005/0041750 A1 | 2/2005 | Lau | |
| 2005/0053172 A1* | 3/2005 | Heikkila | H04B 1/71057 375/333 |
| 2005/0078665 A1 | 4/2005 | Yu et al. | |
| 2005/0085266 A1 | 4/2005 | Narita | |
| 2005/0085269 A1 | 4/2005 | Buljore et al. | |
| 2005/0101259 A1 | 5/2005 | Tong et al. | |
| 2005/0111599 A1 | 5/2005 | Walton et al. | |
| 2005/0180315 A1 | 8/2005 | Chitrapu et al. | |
| 2005/0259567 A1* | 11/2005 | Webster et al. | 370/208 |
| 2005/0265281 A1 | 12/2005 | Ketchum | |
| 2006/0002486 A1 | 1/2006 | Van Nee | |
| 2006/0014499 A1* | 1/2006 | Gorokhov et al. | 455/102 |
| 2006/0045200 A1 | 3/2006 | Bocquet | |
| 2006/0072514 A1 | 4/2006 | Kent et al. | |
| 2006/0093057 A1* | 5/2006 | Zhang | H04B 7/0669 375/267 |
| 2006/0105709 A1 | 5/2006 | Oh et al. | |
| 2006/0133530 A1* | 6/2006 | Kwak et al. | 375/267 |
| 2006/0245513 A1* | 11/2006 | Koo et al. | 375/267 |
| 2006/0291371 A1* | 12/2006 | Sutivong et al. | 370/208 |
| 2007/0004465 A1* | 1/2007 | Papasakellariou et al. | 455/571 |
| 2007/0064632 A1 | 3/2007 | Zheng et al. | |
| 2007/0147536 A1* | 6/2007 | Melzer | H04B 7/0417 375/267 |
| 2007/0183371 A1* | 8/2007 | McCoy | 370/334 |
| 2007/0183515 A1* | 8/2007 | Lim et al. | 375/260 |
| 2007/0280386 A1* | 12/2007 | Waes et al. | 375/347 |
| 2008/0032746 A1 | 2/2008 | Olesen et al. | |
| 2008/0075033 A1 | 3/2008 | Shattil | |
| 2008/0165875 A1 | 7/2008 | Mundarath et al. | |
| 2008/0285670 A1 | 11/2008 | Walton et al. | |
| 2009/0061786 A1* | 3/2009 | Malik et al. | 455/69 |
| 2009/0117859 A1 | 5/2009 | Smith et al. | |
| 2009/0257521 A1 | 10/2009 | Kent et al. | |
| 2009/0310586 A1 | 12/2009 | Shatti | |
| 2010/0020757 A1 | 1/2010 | Walton et al. | |
| 2011/0199926 A1 | 8/2011 | Zheng et al. | |

FOREIGN PATENT DOCUMENTS

| | | |
|---|---|---|
| JP | 2005-124096 A | 5/2005 |
| JP | 2005-524332 A | 8/2005 |
| JP | 5061189 B2 | 10/2012 |
| RU | 2238611 C1 | 10/2004 |
| RU | 2005139127 A | 5/2006 |
| WO | WO 99/56407 A2 | 11/1999 |
| WO | WO 02/054626 A1 | 7/2002 |
| WO | WO 03/041300 A1 | 5/2003 |
| WO | WO 2004/012359 A2 | 2/2004 |
| WO | WO 2005/053186 A1 | 6/2005 |
| WO | WO 2006/049417 A1 | 5/2006 |
| WO | WO 2006/055718 A2 | 5/2006 |
| WO | WO 2006/077990 A2 | 7/2006 |

OTHER PUBLICATIONS

R1-0501162, 3rd Generation Partnership Project (3GPP), "UL Virtual MIMO Transmission for E-UTRA", Nortel, 3GPP TSG-RAN1 Meeting #42bis, San Diego, USA, Oct. 10-14, 2005, 19 pages.

R1-060853, 3rd Generation Partnership Project (3GPP), "Uplink MIMO SC-FDMA With Adaptive Modulation and Coding", Interdigital Communications Corporation, 3GPP TSG RAN WG1 #44bis, Athens, Greece, Mar. 27-31, 2006, 7 pages.

TR 25.814 V7.0.0, 3rd Generation Partnership Project (3GPP), "Technical Specification Group Radio Access Network; Physical Layer Aspects for Evolved Universal Terrestrial Radio Access (UTRA)", (Release 7), Jun. 2006, 1-126.

TR 25.814 V7.1.0, 3rd Generation Partnership Project (3GPP), "Technical Specification Group Radio Access Network, Physical Layer Aspects for Evolved Universal Terrestrial Radio Access (UTRA)", (Release 7), Sep. 2006, 1-132.

R1-051165, 3rd Generation Partnership Project (3GPP), "Proposal for the Uplink Multiple Access Scheme for E-UTRA", Nortel, 3GPP TSG RAN WG1#42bis, San Diego, CA, USA, Oct. 10-14, 2005, 18 pages.

R1-060413, 3rd Generation Partnership Project (3GPP), "Orthogonal Collaborative Spatial Multiplexing (OCSM) for Uplink E-UTRA", LG Electronics, TSG-RAN WG1 LTE Meeting, Denver, USA, Feb. 13-17, 2006, 2 pages.

* cited by examiner

US 9,264,116 B2

METHOD, APPARATUS AND SYSTEM FOR IMPLEMENTING MULTI-USER VIRTUAL MULTIPLE-INPUT MULTIPLE-OUTPUT

CROSS REFERENCE TO RELATED APPLICATION

This application is a continuation of U.S. patent application Ser. No. 11/834,923, filed Aug. 8, 2007; which claims the benefit of U.S. Provisional Patent Application No. 60/836,189 filed Aug. 7, 2006, the contents of which are hereby incorporated by reference herein.

FIELD OF INVENTION

The present invention is related to wireless communication systems. More particularly, the present invention is related to a method, an apparatus, and a system for implementing multi-user virtual multiple-input multiple-output (MIMO) techniques for wireless transmit/receive units (WTRUs) having one or more antennas.

BACKGROUND

In a conventional MIMO communication system, both a transmitter and a receiver employ multiple antennas for transmission and reception. With multiple antennas, multiple wireless channels may be established between the transmitter and the receiver. Generally, capacity and performance of the system are improved as the number of antennas increases.

For a virtual MIMO technique implemented in a conventional MIMO system involving two or more individual WTRUs, each WTRU is equipped with a single antenna to transmit independently onto the same sub-channel, or sub-carrier group (SBG). A base station, or scheduler, organizes the collaboration of two or more WTRUs to transmit on the same sub-channel or the SBG by scheduling the transmission of the WTRUs. However, in the conventional virtual MIMO system, a scheme, or solution, is not provided for WTRUs having more than one antenna.

Therefore, it would be desirable to provide a method for implementing virtual MIMO for WTRUs having two or more antennas.

SUMMARY

The present invention is related to a method, a base station, and a system for implementing multi-user virtual MIMO techniques for WTRUs having one or more antennas. The system includes a base station and at least one WTRU having at least two antennas. The number of antennas of the base station is not less than the number of antennas at any of the WTRUs. The base station generates a channel matrix for the WTRUs and processes received signals from the WTRUs based on a measurement of the channel matrix. The WTRUs may perform transmit preceding, or eigen-beamforming using the channel matrix information. The WTRUs may also perform transmit diversity.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The present invention is applicable to any wireless communication scheme that enables a WTRU to use more than one spatial stream, (i.e., an effective spatial channel). More specifically, the present invention is applicable to single carrier frequency division multiple access (SC-FDMA) MIMO transmission, orthogonal frequency division multiplex access (OFDMA) MIMO transmission, or multi-carrier OFDMA MIMO transmission, where these transmission methods may use frequency hopping.

Figure 1:
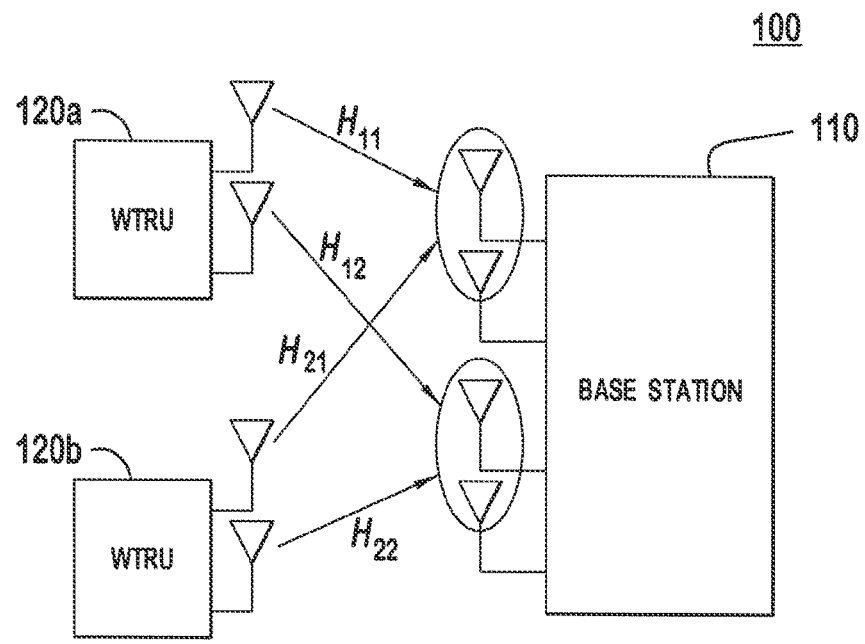
FIG. 1 shows a wireless communication system implementing virtual MIMO for WTRUs having two or more antennas in accordance with the present invention.

FIG. 1 shows a wireless communication system 100 implementing virtual MIMO for WTRUs 120a, 120b having two or more antennas in accordance with the present invention. The system 100 includes a base station 110 and a plurality of WTRUs 120a, 120b. The base station 110 includes a plurality of antennas. At least one of the WTRUs 120a, 120b includes a plurality of antennas. It should be noted that FIG. 1 shows two (2) WTRUs 120a, 120b, each having two (2) antennas, and a base station 110 having four (4) antennas as an example. It should be noted that any number of WTRUs may exist in the system 100, and the WTRUs 120a, 120b and the base station 110 may have any number of antennas.

The number ($N_{rx}$) of antennas at the base station 110 is equal to or greater than the number ($N_{tx}$) of antennas of any one of individual WTRUs 120a, 120b, which make up a virtual channel between the WTRUs 120a, 120b and the base station 110. It is well known that the capacity of the MIMO channel increases linearly with the minimum of $N_{tx}$ and $N_{rx}$.

For example, the base station 110 may allocate a certain number of base station antennas, (at least the same number of antennas that each WTRU 120a, 120b includes), to each of the WTRUs 120a, 120b as shown by dotted circles in FIG. 1 and generates an effective channel matrix for the channels between the base station 110 and the WTRUs 120a, 120b. The effective channel matrix, $H_{eff}$, from the WTRUs 120a, 120b to the base station 110 is written as follows:

$$H_{eff} = \begin{bmatrix} H_{11} & H_{12} \\ H_{21} & H_{22} \end{bmatrix}; \quad \text{Equation (1)}$$

where $$H_{ij} = \begin{bmatrix} h_{11} & h_{12} \\ h_{21} & h_{22} \end{bmatrix}; \quad \text{Equation (2)}$$

where $H_{ij}$ is a multipath channel matrix between the i-th WTRU and the j-th base station antenna group, and $h_{11}$, $h_{12}$, $h_{21}$, and $h_{22}$ are channel coefficients for the two transmit antennas of each WTRU and the two receive antennas of each base station antenna group, respectively. Equation (1) is an effective MIMO channel for multi-user virtual MIMO and Equation (2) is a single MIMO channel for a specific WTRU. It should be noted that in Equations (1) and (2), the example for two (2) antennas at the base station and the WTRU respectively was used. However, any combination of transmit and receive antennas where at least one of the WTRUs and the base station has more than one antenna may be considered. The matrix dimensions for Equations (1) and (2) will scale with the number of antennas used.

A spatial stream is equivalent to a scalar channel carried by the MIMO channel given by Equation (2). If Equation (3) is satisfied, $$[H_{11} \; H_{21}]\begin{bmatrix}(H_{12})^*\\(H_{22})^*\end{bmatrix}=0, \quad \text{Equation (3)}$$

two equivalent 1(Tx).times.2(Rx) systems are established where each system comprises a scalar channel defined by the spatial stream.

Figure 2:
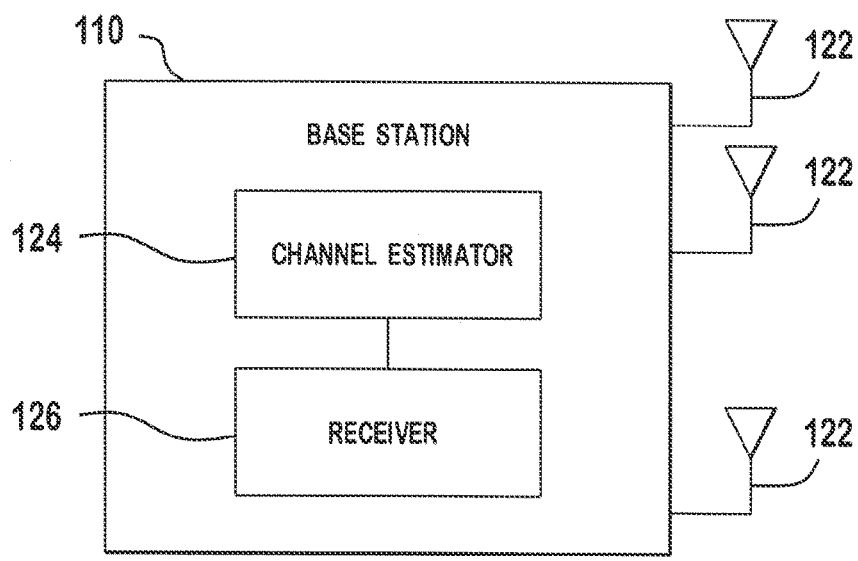
FIG. 2 is a block diagram of a base station configured in accordance with the present invention.

FIG. 2 is a block diagram of a base station 110 in accordance with the present invention. The base station 110 includes a plurality of antennas 122, a channel estimator 124, and a receiver 126. Other conventional components of the base station 110 are not shown in FIG. 2 for simplicity. The base station 110 includes a number of antennas that is equal to or greater than the number of antennas of any one of WTRUs 120a, 120b being served by the base station 110 with the virtual MIMO scheme, (i.e., the base station 110 includes at least two (2) antennas). The channel estimator 124 generates a channel matrix for WTRUs 120a, 120b. The receiver 126 processes the signals from the WTRUs 120a, 120b using the channel matrix. The receiver 126 may use a linear minimum mean square error (LMMSE) technique to recover the data for each of the WTRUs 120a, 120b. With this scheme, the virtual MIMO technique can be extended to WTRUs having more than one antenna.

The WTRUs 120a, 120b may implement transmit eigen-beamforming, transmit precoding (either codebook-based or non-codebook-based), spatial multiplexing, diversity techniques including space time block coding (STBC), space frequency block coding (SFBC), cyclic delay diversity (CDD), or combinations of these techniques. For the eigen-beamforming or transmit precoding, the base station may send a decomposed channel matrix, (i.e., V matrix obtained from decomposing the channel matrix by singular value decomposition (SVD) or similar operation), to the WTRUs. The system capacity is increased using a smaller number of MIMO antennas at the WTRU, (e.g., 2 antennas at the WTRU 120a, 120b).

Some WTRUs may only support one spatial stream. (i.e., having only one antenna), while the remainder of WTRUs may support more than one spatial stream, (i.e., having more than one antenna). With this scheme, the base station is given much more flexibility compared to single antenna virtual MIMO due to the added virtual channel dimensions. Potential reduced inter-cell interference is another benefit due to reduced transmission power requirements at the WTRU.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. In a wireless communication system including a base station and a plurality of wireless transmit/receive units (WTRUs), the base station including a plurality of antennas grouped into base station antenna groups, at least one of said WTRUs including at least two antennas, and the number of antennas of the base station being equal to or greater than the number of antennas of any of the WTRUs, a method for implementing multi-user virtual multiple-input multiple-output (MIMO), the method comprising:

generating a multipath channel matrix between each of the WTRUs and each of the base station antenna groups, wherein the multipath channel matrix comprises channel coefficients for the antennas associated with each of the WTRUs and the antennas associated with each of the base station antenna groups;

generating an effective channel matrix for channels between the base station and the WTRUs, wherein the effective channel matrix comprises the multipath channel matrices for each of the WTRUS and is an effective MIMO channel for the multi-user virtual MIMO; and processing received signals from the WTRUs using the effective channel matrix, wherein a linear minimum mean square error is configured to be used to recover at least a portion of data in the received signals being processed.

2. The method of claim 1 wherein a transmit precoding is configured to be performed using the effective channel matrix.

3. The method of claim 1 wherein eigen-beamforming is configured to be performed using the effective channel matrix.

4. The method of claim 1 wherein transmit diversity is configured to be performed.

5. The method of claim 4 wherein at least one of space time block coding (STBC), space frequency block coding (SFBC), and cyclic delay diversity (CDD) is configured to be performed.

6. The method of claim 1 wherein at least one of the WTRUs supports one spatial stream and the rest of the WTRUs support at least two spatial streams.

7. The method of claim 1 wherein the base station and the WTRUs implement single carrier frequency division multiple access (SC-FDMA).

8. The method of claim 1 wherein the base station and the WTRUs implement orthogonal frequency division multiple access (OFDMA).

9. The method of claim 1 wherein the base station and the WTRUs implement multi-carrier orthogonal frequency division multiple access (MC-OFDMA).

10. A wireless communication system for implementing multi-user virtual multiple-input multiple-output (MIMO), the system comprising:
a plurality of wireless transmit/receive units (WTRUs), at least one WTRU having at least two antennas; and
a base station comprising:
a plurality of antennas, the number of the base station antennas being equal to or greater than the number of antennas of any of the WTRUs and the plurality of antennas being grouped into base station antenna groups;
a channel estimator for generating a multipath channel matrix between each of the WTRUs and each of the base station antenna groups and an effective channel matrix for channels between the base station and the WTRUs based on the multipath channel matrices, wherein the effective channel matrix is an effective MIMO channel for the multi-user virtual MIMO, and wherein the multipath channel matrix comprises channel coefficients for the antennas associated with each of the WTRUs and the antennas associated with each of the base station antenna groups; and
a receiver for processing signals transmitted from the WTRUs using the effective channel matrix, wherein a linear minimum mean square error is configured to be used to recover at least a portion of data in the signals being processed.

11. The system of claim 10 wherein the WTRUs are configured to perform transmit precoding using the effective channel matrix.

12. The system of claim 10 wherein the WTRUs are configured to perform eigen-beamforming using the effective channel matrix.

13. The system of claim 10 wherein the WTRUs are configured to perform transmit diversity.

14. The system of claim 13 wherein the WTRUs are configured to perform at least one of space time block coding (STBC) and space frequency block coding (SFBC).

15. The system of claim 10 wherein at least one of the WTRUs supports one spatial stream and the rest of the WTRUs support at least two spatial streams.

16. The system of claim 10 wherein the base station and the WTRUs implement single carrier frequency division multiple access (SC-FDMA).

17. The system of claim 10 wherein the base station and the WTRUs implement orthogonal frequency division multiple access (OFDMA).

18. The system of claim 10 wherein the base station and the WTRUs implement multi-carrier orthogonal frequency division multiple access (MC-OFDMA).

19. The system of claim 10 wherein the WTRUs selectively transmit the signals using one of a single stream MIMO and a multi-stream MIMO.

20. A base station for implementing multi-user virtual multiple-input multiple-output (MIMO) for a plurality of wireless transmit/receive units (WTRUs), at least one WTRU having at least two antennas, the base station comprising:
a plurality of antennas, the number of the base station antennas being equal to or greater than the number of antennas of any of the WTRUs and the plurality of antennas being grouped into base station antenna groups;
a channel estimator for generating a multipath channel matrix between each of the WTRUs and each of the base station antenna groups and an effective channel matrix for channels between the base station and the WTRUs based on the multipath channel matrices, wherein the effective channel matrix is an effective MIMO channel for the multi-user virtual MIMO, and wherein the multipath channel matrix comprises channel coefficients for the antennas associated with each of the WTRUs and the antennas associated with each of the base station antenna groups; and
a receiver for processing signals transmitted from the WTRUs using the effective channel matrix, wherein a linear minimum mean square error is configured to be used to recover at least a portion of data in the signals being processed.

21. The base station of claim 20 wherein the receiver is configured to process the signals that are processed for transmit precoding using the effective channel matrix.

22. The base station of claim 20 wherein the receiver is configured to process the signals that are processed for eigen-beamforming using the effective channel matrix.

23. The base station of claim 20 wherein the receiver is configured to process the signals that are processed for transmit diversity.

24. The base station of claim 23 wherein the receiver is configured to process the signals that are processed for at least one of space time block coding (STBC), space frequency block coding (SFBC), and cyclic delay diversity (CDD).

25. The base station of claim 20 wherein at least one of the WTRUs supports one spatial stream and the rest of the WTRUs support at least two spatial streams.

26. The base station of claim 20 wherein the base station implements single carrier frequency division multiple access (SC-FDMA).

27. The base station of claim 20 wherein the base station implements orthogonal frequency division multiple access (OFDMA).

28. The base station of claim 20 wherein the base station implements multi-carrier orthogonal frequency division multiple access (MC-OFDMA).

* * * * *